United States Patent [19]
Rogers

[11] 3,791,013
[45] Feb. 12, 1974

[54] HAND TOOLS
[75] Inventor: Edward A. Rogers, Ashford Common, England
[73] Assignee: Wilkinson Sword Limited, London, England
[22] Filed: Nov. 3, 1972
[21] Appl. No.: 303,349

[30] Foreign Application Priority Data
Nov. 10, 1971  Great Britain.................. 52,127/71

[52] U.S. Cl..................................... 30/254, 30/343
[51] Int. Cl............................................ B26b 13/00
[58] Field of Search..... 30/254, 260, 341, 343, 348, 30/259, 262

[56] References Cited
UNITED STATES PATENTS
2,639,504  5/1953  May...................................... 30/260
2,965,967  12/1960  Wahl................................ 30/254 X FOREIGN PATENTS OR APPLICATIONS
659,608  10/1951  Great Britain........................ 30/341
817,851  12/1951  Germany.............................. 30/348

Primary Examiner—James L. Jones, Jr.
Assistant Examiner—J. C. Peters
Attorney, Agent, or Firm—Wolfe, Hubbard, Leydig, Voit & Osann, Ltd.

[57] ABSTRACT

In each of the illustrated hand tools, each blade is secured to a tang in the form of a strip of carbon steel, the whole tank being sheathed in plastics material to form the shank and handle. In one embodiment each blade is formed by a strip of carbon steel integral with the tang, and on which a blade edge has been formed, the width of the strip in the blade being, in general, less than that of a conventional blade but having a backing of plastics material molded along the strip to make up its width.

4 Claims, 6 Drawing Figures

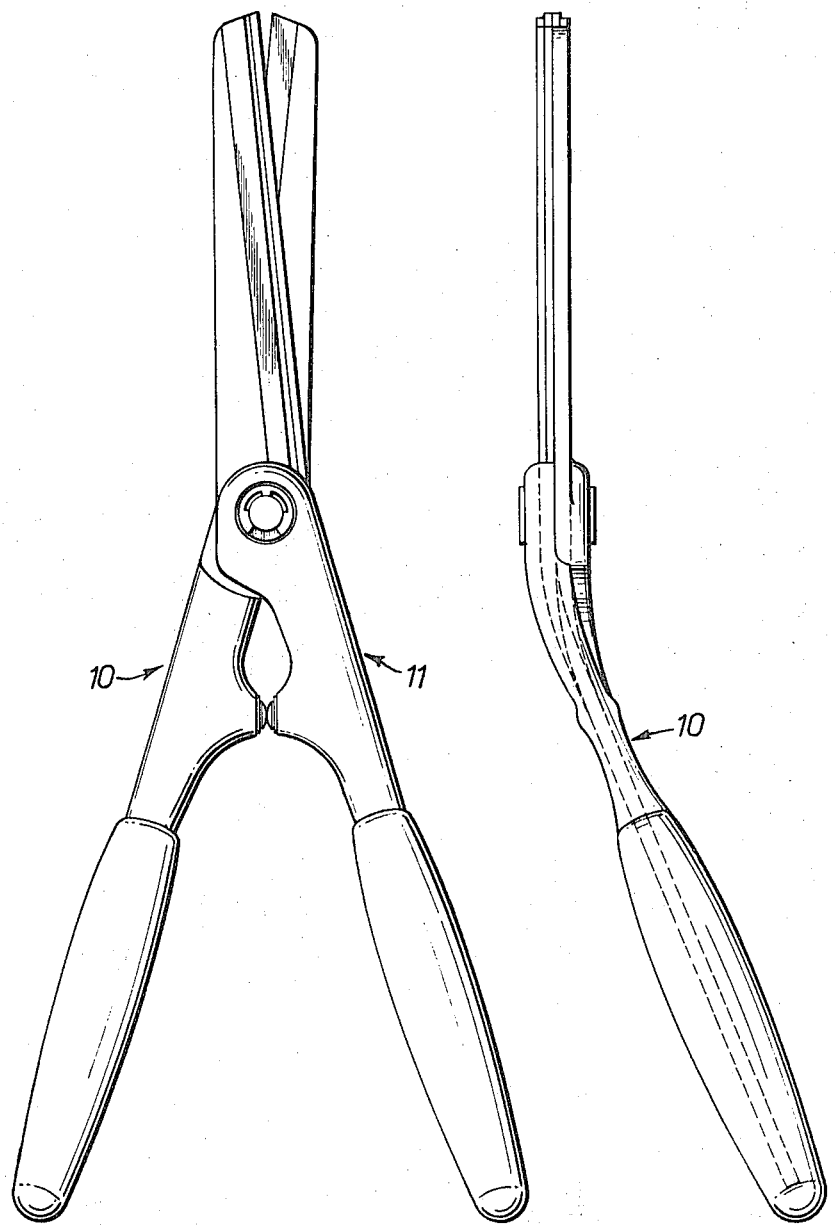

Patented Feb. 12, 1974
3,791,013
2 Sheets-Sheet 2
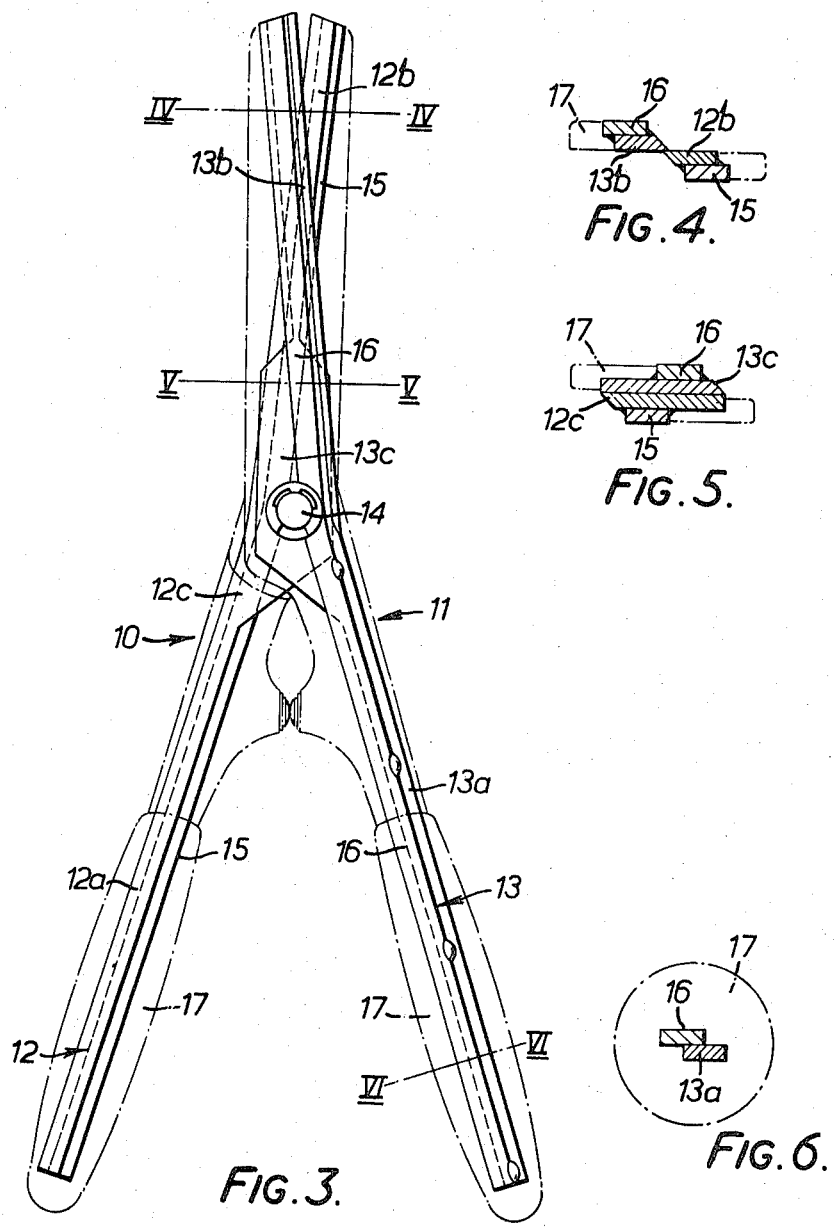

HAND TOOLS

BACKGROUND OF THE INVENTION

Conventional garden shears and similar hand tools incorporate a large quantity of costly carbon steel or stainless steel since this material normally forms substantially the whole of the shears except the handle, which can be of wood or plastics. All exposed metal parts of the shears require finishing treatment, which is expensive, but costs have been reduced in this respect by coating the shank of the shears, i.e. the portion between the handle and pivot, with plastics.

SUMMARY OF THE INVENTION

The invention relates to hand tools comprising two cooperating members which are arranged to be moved towards and away from one another by handles which are coupled to the respective co-operating members. Such tools will be referred to hereinafter generically as being of the type specified.

Whilst of broad application, the invention is particularly applicable to cutting or shearing tools, for example garden shears, pruners, household scissors and metal cutters.

One object of the invention is to reduce the manufacturing costs of such tools by reducing the quantity of carbon steel or other costly material used in their production.

This is achieved by reserving the use of the more costly materials for the functions essentially requiring such material, e.g. in the formation of a blade edge and in providing a load-carrying member in the shank, and to use plastics material or other lower cost material in other parts of the tool where the properties of the costlier materials are not required. Plastics materials nevertheless are capable of carrying some load and consequently the ratio of costlier material to less costly material in different parts of the tool will depend on the required dimension and the required properties of the respective parts.

Thus in the handle and shank of the tool a rigid strip of metal or other material forming a tang, to which the blade is secured, can form a load-carrying core around which is molded a body or sheath of plastics material.

For further cost reduction, the blade comprises a rigid strip of metal or other material, forming an integral extension of the rigid strip of the shank and handle, the extension strip having a blade edge formed thereon but being in general narrower than the width of a conventional blade. The width can be made up by a backing of plastics material molded along the further strip.

DESCRIPTION OF THE DRAWINGS

FIGS. 1 and 2 are respectively a plan and a side view of a garden shear in accordance with the invention;

FIG. 3 is a plan of the shear of FIG. 1 showing the internal construction;

FIGS. 4, 5 and 6 are sections on the lines IV—IV, V—V and VI—VI of FIG. 3;

FIGS. 1-6 illustrate a garden shear in which the two pivotally-interconnected members 10, 11 each comprise a rigid core of metal, or other material of suitable strength and rigidity, which has been embedded in plastics material, leaving the blade edges exposed. This construction enables an economical product to be made by reducing the amount of high cost material, e.g. carbon steel, to that necessary for forming the blade edges and for giving adequate strength throughout. No regard need be had to the general surface finish of much of the material since it is to be covered with plastics material which can be formed to the desired external shape, for example in a moulding operation.

Considering the construction in further detail, the core of each pivoted member comprises a rectangular-section strip 12, 13, in particular of carbon steel, which is relatively narrow over the tang portion 12a, 13a and blade portion 12b, 13b but is broader over the pivot portion 12c, 13c to provide strong and wear-resistant bearings for the reception of a conventional pivot bolt assembly 14. In the finished shear, each blade portion will be ground to form a cutting or shearing blade edge and the depth of the strip must be adequate to provide this edge. Where however greater strength is required, a strengthening strip 15, 16 of cheaper material, such as mild steel, can be laid alongside the carbon steel strip and bonded to it, for example by welding.

Each of the pivoted members of the shear is then completed by locating the member in a mould and moulding plastics material 17 on to it to make up the desired shape of the finished member, leaving, of course, a hole through the pivot portion of each member for reception of the pivot bolt. If required, the moulding can be a two or more stage operation enabling the plastics material of the blade and shank portions to be of a different colour from that of the handle portion, the latter conveniently having a wood-simulating appearance.

Since the plastics material should be protected from frictional wear between the blades, the plastic mouldings will be set back from the abutting faces of the blades as seen in FIG. 5.

The dimensions of the plastics body in the handle and shank will be substantially greater than those of the core-forming strip which it encases (as distinct from a mere plastics coating) but the actual dimensions will be chosen to provide a balance between the relative strengths and costs of the core and of the surrounding plastics body, and the labour costs in forming the core and sheathing.

The plastics material can itself be loaded with reinforcing material, for example glass, and is preferably chosen so that it will bond readily to the metal parts of the shear.

Although reference has been made above to carbon steel as the more costly material for forming the core, it will be apparent that stainless steel could be used in place of carbon steel. Alternatively a first strip forming the blade portion could be of stainless steel bonded to a second strip forming the tang which could be of carbon steel. As a further alternative, the rigid strip could be made throughout of carbon steel or other suitable material cheaper than stainless steel, with only a blade edge portion of stainless steel bonded to the rigid strip, the whole being encased in plastics except for the stainless steel edge portion and the pivot bearing surfaces which would remain exposed.

I claim:

1. A hand tool comprising
   two cooperating interconnected members movable pivotally towards and away from each other, each said member comprising an elongate body of plastics material, a composite metal strip extending through said body, said strip having a tang-portion encased in the plastics body at one end thereof to form a handle and a blade-edge portion embedded in the plastics body at the other end thereof to form the blade, the composite metal strip comprising a main strip of high quality steel on which a durable blade edge has been formed, and a reinforcing strip of relatively inferior quality steel which has been superimposed upon and bonded to the main strip of metal.

2. A hand tool comprising two cooperating interconnected members movable towards and away from each other by handles connected thereto, each member comprising a main strip of metal having at one end a cutting-edge portion and at the opposite end a tang-forming portion, the metal being selected from the group consisting of carbon steel and stainless steel, a reinforcing strip of metal superimposed upon and bonded to the main strip to strengthen the main strip, the metal of the reinforcing strip being different from that of the main strip and being selected from a group of metals of lower cost than the metal selected for the main strip, and a body of plastics material molded on to the main and reinforcement strips to form a handle on the said tang-forming portion, the body extending from the handle along the cutting-edge portion.

3. A hand tool according to claim 1 wherein said main strip is made of carbon steel and said reinforcing strip is made of mild steel.

4. A hand tool according to claim 1 wherein said main strip is made of stainless steel and said reinforcing strip is made of a metal selected from the group comprising mild steel and carbon steel.

* * * * *